United States Patent
Chen et al.

(10) Patent No.: US 6,908,689 B1
(45) Date of Patent: Jun. 21, 2005

(54) RUTHENIUM-ALUMINUM UNDERLAYER FOR MAGNETIC RECORDING MEDIA

(75) Inventors: Qixu Chen, Milpitas, CA (US); Zhong Wu, Fremont, CA (US); Samuel D. Harkness, IV, San Francisco, CA (US); Rajiv Y. Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 85 days.

(21) Appl. No.: 10/022,728

(22) Filed: Dec. 20, 2001

Related U.S. Application Data

(60) Provisional application No. 60/274,101, filed on Mar. 7, 2001.

(51) Int. Cl.[7] ................................................. G11B 5/66
(52) U.S. Cl. ........................ 428/611; 428/651; 428/652; 428/678; 428/332; 428/409; 428/694 TS; 204/192.2; 205/255; 205/271
(58) Field of Search ................................ 428/611, 651, 428/652, 678, 332, 409, 694 TS; 204/192.2; 205/255, 271

(56) References Cited

U.S. PATENT DOCUMENTS

| | | | |
|---|---|---|---|
| 5,399,386 A | | 3/1995 | Jahnes et al. |
| 5,480,733 A | * | 1/1996 | Okumura et al. ......... 428/694 T |
| 5,490,809 A | * | 2/1996 | Jones et al. .................. 451/60 |
| 5,693,426 A | | 12/1997 | Lee et al. |
| 5,723,198 A | | 3/1998 | Hosoe et al. |
| 5,733,370 A | * | 3/1998 | Chen et al. .................. 117/105 |
| 5,849,386 A | * | 12/1998 | Lal et al. ................... 428/65.3 |
| 5,866,227 A | * | 2/1999 | Chen et al. ................ 428/65.3 |
| 5,989,674 A | * | 11/1999 | Marinero et al. .......... 428/65.3 |
| 6,010,795 A | * | 1/2000 | Chen et al. ................. 428/611 |
| 6,077,924 A | | 6/2000 | Chiang et al. |
| 6,132,892 A | | 10/2000 | Yoshikawa et al. |
| 6,156,404 A | | 12/2000 | Ross et al. |
| 6,159,625 A | * | 12/2000 | Ueno ...................... 428/694 T |
| 6,174,582 B1 | | 1/2001 | Bian et al. |
| 6,183,832 B1 | | 2/2001 | Margulies et al. |
| 6,218,033 B1 | * | 4/2001 | Cao et al. ................. 428/694 T |
| 6,432,562 B1 | | 8/2002 | Wu et al. |
| 6,586,116 B1 | * | 7/2003 | Bian et al. ................... 428/651 |
| 6,593,009 B2 | * | 7/2003 | Bian et al. ................... 428/611 |
| 6,596,419 B1 | * | 7/2003 | Chen et al. ............. 428/694 TS |
| 6,613,460 B1 | * | 9/2003 | Abarra et al. ........... 428/694 TS |
| 2001/0024742 A1 | * | 9/2001 | Bian et al. .............. 428/694 TS |
| 2001/0033949 A1 | * | 10/2001 | Abarra et al. ........... 428/694 TS |
| 2002/0063108 A1 | * | 5/2002 | Wang et al. ................... 216/22 |
| 2002/0150796 A1 | * | 10/2002 | Kanbe et al. ........... 428/694 TS |

FOREIGN PATENT DOCUMENTS

WO     WO98-16923    * 4/1998

OTHER PUBLICATIONS

U.S. Appl. No. 60/236,011.*
Li–Lien Lee, et al., "NiAl Underlayers for CoCrTa Magnetic Thin Films," *IEEE Transactions on Magnetics*, vol. 30, No. 6, Nov. 1994, pp. 3951–3953.
Li–Lien Lee, et al., "Seed Layer Induced (002) Crystallographic Texture in NiAl Underlayers," *Journal of Applied Physics*, vol. 79, No. 8, Apr. 15, 1996, pp. 4902–4904.
Li–Lien Lee, et al., "FeAl Underlayers for CoCrPt Thin Film Longitudinal Media," *Journal of Applied Physics*, vol. 81, No. 8, Apr. 15, 1997, pp. 4366–4368.

* cited by examiner

*Primary Examiner*—Kevin M. Bernatz
(74) *Attorney, Agent, or Firm*—Raghunath S. Minisandram; Jesus Del Castillo

(57) ABSTRACT

A magnetic recording medium containing a B-2 structured ruthenium-aluminum underlayer comprising a (200) crystallographic orientation with a thickness from about 50 Å to about 800 Å, and a magnetic layer with a Co(11.0) crystallographic orientation, and a method of making the same are disclosed. The medium deposited on mechanically textured and surface-oxidized NiP film has a relatively high remanent coercivity and a relatively high signal to medium noise ratio even at low OR-Mrt.

18 Claims, 5 Drawing Sheets

RUTHENIUM-ALUMINUM UNDERLAYER FOR MAGNETIC RECORDING MEDIA

RELATED APPLICATIONS

This application claims priority from Provisional Application Ser. No. 60/274,101, filed Mar. 7, 2001, entitled "Magnetic Recording Media with RuAl Underlayers" the entire disclosure of which is incorporated herein by reference.

FIELD OF INVENTION

This invention relates to magnetic recording media, such as thin film magnetic recording disks, and to a method of manufacturing the media. The invention has particular applicability to high areal density magnetic recording media having thin films for longitudinal magnetic recording media.

BACKGROUND

The increase demand for higher areal recording densities imposes increasingly greater demands on longitudinal magnetic recording media in terms of remanent coercivity (Hr), magnetic remanence (Mr), coercivity squareness (S*), signal-to-medium noise ratio (SMNR), and narrow track recording performance. It is extremely difficult to produce magnetic recording media that satisfies all or most of these requirements.

Longitudinal recording media is structured as a layered material of films deposited on a substrate. The recording media typically has one or more underlayers, such as a chromium (Cr) or a Cr alloy film, one or more magnetic layers, such as a cobalt (Co) alloy, and a protective overcoat. The Co alloy magnetic layer typically contains polycrystallines grown on a polycrystal Cr or Cr alloy underlayer. The underlayer, magnetic layer, and protective overcoat are typically deposited by physical vapor deposition techniques, such as sputtering.

A magnetic material is composed of a number of submicroscopic regions called domains. Each domain contains parallel atomic magnetic moments but the directions of magnetization of different domains are not necessarily parallel. In the absence of an applied magnetic field, adjacent domains may be oriented randomly in any number of several directions, often called the directions of easy magnetization, which depend on the geometry of the crystal. When a magnetic field is applied, many of the domains may rotate and align parallel to the applied field. Also, the domains most nearly parallel to the direction of the applied field may grow in size at the expense of the others. This is called boundary displacement of the domains or domain growth. When the material reaches the point of saturation magnetization, no further domain growth occurs, even if the magnitude of the external magnetic field is increased.

Magnetic properties, such as remanent coercivity (Hr), remanent magnetization (Mr) and coercive squareness (S*), which are important to the recording performance of the recording media, depend in part on the microstructure of the Co alloy magnetic film for a given Co alloy composition. For longitudinal magnetic recording media, the desired crystalline structure of the Co and Co alloys is hexagonal close packed (HCP) with uniaxial crystalline anisotropy and a magnetization easy direction along the c-axis in the plane of the film. The better the in-plane c-axis crystallographic texture is, the higher the remanent coercivity of the Co-alloy magnetic film is.

The grain size of the magnetic film also affects the magnetic performance of recording media. Remanent coercivity increases with an increase in grain size in certain range of grain size, however, the larger the grain size is, the higher the medium noise level of the recording media is, that is, the lower the SMNR is. Thus, there exists a need to achieve high remanent coercivities without the increase in medium noise associated with relatively large grain size. To achieve a low noise recording medium, the Co alloy magnetic layer should have fairly uniform and small grain size with grain boundaries that can magnetically isolate neighboring grains. This kind of microstructure and crystallographic texture is normally achieved by manipulating the deposition process, by grooving the non-magnetic substrate surface, which is referred as mechanical texturing, or most often by the proper use of one or more underlayers with a preferred crystallographic orientation.

The linear recording density can be increased by increasing the remanent coercivity and/or by decreasing the medium noise of the recording medium. This can be accomplished by producing a magnetic layer with fine, magnetically non-coupled grains. Medium noise in thin films is a dominant factor restricting increased recording densities, and is attributed in part to inhomogeneous grain size and intergranular exchange coupling. Accordingly, in order to increase linear density, medium noise must be minimized by suitable microstructure control.

Recording performance is also determined by media properties known as PW50 and overwrite (OW). PW50 is the half width of the output signal, that is, the width of that portion of a pulse from the time its rising edge reaches one half of its amplitude to the time its falling edge falls to one half of its amplitude. A wide PW50 indicates that adjacent bits are crowded together resulting in interference, which limits the linear packing density of bits in a given track. Means of reducing PW50 include reducing Mrt (magnetic film thickness, t, times magnetic remanence, Mr), raising Hr, and increasing S*.

OW is a measure of what remains of a first signal after a second signal (for example of a different frequency) has been written over it on the media. Recording media with relatively poor OW characteristics maintains a good portion of the first signal after erasure. OW is improved by raising S* and by decreasing Hr and Mrt.

Li-Lien Lee et al. disclosed NiAl underlayers, which have small grain size, and promote (10.0) crystallographic orientation of the magnetic media, ("NiAl underlayers for CoCrTa magnetic thin films", IEEE Transaction on Magnetics, Vol. 30, No. 6, pp. 3951–3953, November 1994, and U.S. Pat. No. 5,693,426). Seagate's co-pending patent application, SEA 2758, filed on Sep. 10, 1999, and entitled "Magnetic Recording Medium with a NiAlRu seedlayer," discloses NiAlRu seedlayers, which also promote (10.0) crystallographic orientation of the magnetic media. "Seedlayer Induced (002) Crystallographic Texture in NiAl Underlayers," L.-L. Lee, D. E. Laughlin and D. N. Lambeth, J. Appl. Phys., 79 (8), pp. 4902–4904 (1996), discloses a MgO seedlayer, which induces Cr(200) preferred orientation. "FeAl Underlayers for CoCrPt Thin Film Media," L.-L. Lee, D. E. Laughlin and D. N. Lambeth, J. Appl. Phys., 81 (8), pp. 43664368 (1997), first reported an FeAl underlayer having a B2 structure.

U.S. Pat. No. 6,174,582 discloses a seedlayer containing a refractory metal that promotes a (200) orientation in the Cr underlayer and a (11 $\bar{2}$ 0) orientation in the magnetic layer. The refractory metal can be selected from tantalum, niobium, vanadium, tungsten, molybdenum, or chromium. U.S. Pat. No. 6,156,404 discloses an underlayer with a B2 crystal structure. This underlayer encourages a subsequent chromium layer to grow in a manner other than with a (200) orientation. In one case, the underlayer induces the chromium underlayer to grow with a preferred (110) orientation. The materials that can be used as an underlayer include a ruthenium-aluminum alloy. The materials that can be used for the chromium underlayer include chromium or a chromium alloy such as an alloy containing tantalum, vanadium, or molybdenum.

In order to store as much digital information as possible on a recording medium there is a continuing need for improved areal density magnetic recording media exhibiting high remanent coercivity and high SMNR. It is also desirable to produce recording media that has a minimum PW50. The need for lighter, smaller and better performing computers with greater storage density demands higher density recording media. The present invention satisfies these demands with a longitudinal magnetic recording media having high remanent coercivity and low medium noise.

Media with Co(10.0) preferred orientations have narrower in-plane C-axis dispersion than that of the media with Co(10.0) preferred orientations. Oriented magnetic media having Cr-containing underlayers with cubic (200) crystallographic orientations and Co(11.0) crystallographic orientations have better recording performances than isotropic media having Co(10.0) crystallographic orientations.

Oriented magnetic media with Mrt orientation ratio (OR-Mrt) of about 1.5 have about 2.5 dB higher media signal-to-noise ratio (SMNR) tested at 500 kfci (thousand flux reversals per inch) than isotropic media, which have OR-Mrt of 1. Mrt orientation ratio stands for the ratio of Mrt along the circumferential direction over Mrt along the radial direction. Mrt stands for product of remanent magnetization and magnetic film thickness. The Mrt orientation ratio of more than 1.05 is caused by the combination of circumferential mechanical texturing/grooving of the substrate and the Co(11.0) crystallographic orientation. Oriented media are the media with OR-Mrt more than 1, e.g. more than 1.05. Deeper grooves usually induce higher orientation ratio, but also increase film roughness and higher flight height of the magnetic heads will not be avoided. High flight height is not desirable. There is, however, a need to find other underlayer materials, which promote Co(11.0) crystallographic orientations and good recording performances of magnetic media. There is also a need to find a method, which can be used to make an oriented medium with good recording performances at low OR-Mrt, less than 1.2.

SUMMARY OF THE INVENTION

The invention provides a magnetic recording medium for high areal recording density exhibiting a relatively high remanent coercivity, and/or a relatively high SMNR. One way of achieving this goal is to produce a magnetic recording medium with an underlayer that can affect the microstructure of a subsequent underlayer and/or magnetic layer. The magnetic recording medium, includes a substrate, a B-2 structured ruthenium-aluminum-containing underlayer; and a magnetic layer comprising a Co(11.0) orientation. Another way of achieving this goal is to produce an oriented magnetic recording medium comprising a substrate with oxidized and mechanical textured NiP film on the surface; a B-2 structured ruthenium-aluminum-containing underlayer, and a magnetic layer comprising a Co(11.0) orientation.

One embodiment of this invention is a magnetic recording medium, comprising a non-magnetic substrate, a B2-structured ruthenium-aluminum-containing underlayer comprising a (200) crystallographic orientation; and a magnetic layer comprising a Co(11.0) crystallographic orientation. The ruthenium-aluminum-containing underlayer could comprise RuAl, wherein Ru is in a range from about 45 to about 51.5 atomic percent. In another embodiment the non-magnetic Al/NiP substrate is mechanically textured with grooves substantially along circumferential direction at the surface of the disk substrate and OR-Mrt of the medium is more than 1.05. In another embodiment the magnetic recording medium comprises an oxidized NiP film on the non-magnetic substrate. The magnetic recording medium could further comprise a chromium-containing second underlayer disposed between the ruthenium-aluminum-containing underlayer and the magnetic layer. The magnetic recording medium could further comprise a cobalt-chromium-containing intermediate layer disposed between the ruthenium-aluminum-containing underlayer and the magnetic layer, if the second underlayer is not used, or between the chromium-containing second underlayer and the magnetic layer. The substrate can be commercially available NiP-plated Al-alloy substrate. The electrolessly plated NiP usually has a thickness about 150,000 Å. The surface of the NiP is naturally oxidized in the atmosphere. The substrate can comprise also other materials, such as glass, and glass-ceramic. The oxidized NiP film can be at the surface of the commercial NiP-plated Al-alloy substrate or can be sputter-deposited on non-metallic glass or glass-ceramic substrates and oxidized. The oxidized NiP film could comprise (a) P in a range of 12 to 50 atomic percent, preferably of 17 to 42 atomic percent and most preferably of 18 to 25 atomic percent; and (b) oxygen in a range of about 0.5 to about 50 atomic percent in the top 50 Å of the oxidized NI film. The oxidized NiP film could have a thickness in a range of 50–200,000 Å. If the NiP film is at the surface of commercially available Al-alloy substrate, the thickness of the NiP is about 50,000 to 200,000 Å. If the NiP film is sputter-deposited, the thickness is about 50–2000 Å, and preferably 50–1500 Å. Mechanical texture can be applied on the surface of the NiP film. The magnetic layer could comprise an alloy material selected from the group consisting of CoCrPtB, CoCrPtBTa, CoCrPtBTaNb, CoCrPt, CoCrNi, CoCrPtTa, CoCrPtTaNb, and CoCrTa. The ruthenium-aluminum-containing underlayer could have a thickness of 50–800 Å, preferably of 60–600 Å and most preferably of 200–300 Å.

Another embodiment of this invention is a method of making a magnetic recording medium comprising, providing a non-magnetic substrate; depositing a B-2 structured ruthenium-aluminum-containing underlayer comprising a (200) crystallographic orientation; and depositing a magnetic layer comprising a Co(11.0) crystallographic orientation.

Preferably, a chromium-containing second underlayer is also deposited to form the recording medium. It is also preferred that a cobalt-chromium-containing intermediate layer is deposited between the RuAl-containing underlayer and the magnetic layer, if the second underlayer is not used, or between the second underlayer and the magnetic layer. It is also preferred that the ruthenium-aluminum underlayer be deposited on an oxidized NiP layer, wherein the oxidized NiP layer has a phosphorous content of 12 at. % to 50 at. %, preferably of 17 at. % to 42 at. %, and most preferably 18 at. % to 25 at. %, and an oxygen content of from 0.5 at. % to 50 at. %, in the top 50 Å of the oxidized NiP layer.

In this invention, "means for promoting a Co(11.0) crystallographic orientation in the magnetic layer" is a B-2 structured ruthenium-aluminum underlayer comprising a (200) crystallographic orientation.

Additional advantages of this invention would become readily apparent to those skilled in this art from the following detailed description, wherein only the preferred embodiments of this invention are shown and described, simply by way of illustration of the best mode contemplated for carrying out this invention. As would be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

This invention will be better understood by reference to the Detailed Description taken together with the attached drawings, wherein.

DETAILED DESCRIPTION

This invention is directed to magnetic recording media suitable for high areal recording density exhibiting relatively high remanent coercivity and relatively high SMNR. This recording media includes a B-2 structured ruthenium-aluminum-containing underlayer, a cobalt or cobalt alloy magnetic layer with a preferred Co(11.0) orientation. The ruthenium-aluminum underlayer in combination with the magnetic layer has a positive effect on remanent coercivity, SMNR, and/or PW50, relative to recording media without the ruthenium-aluminum underlayer. The term "magnetic layer" means a cobalt or cobalt alloy magnetic layer.

Figure 4:
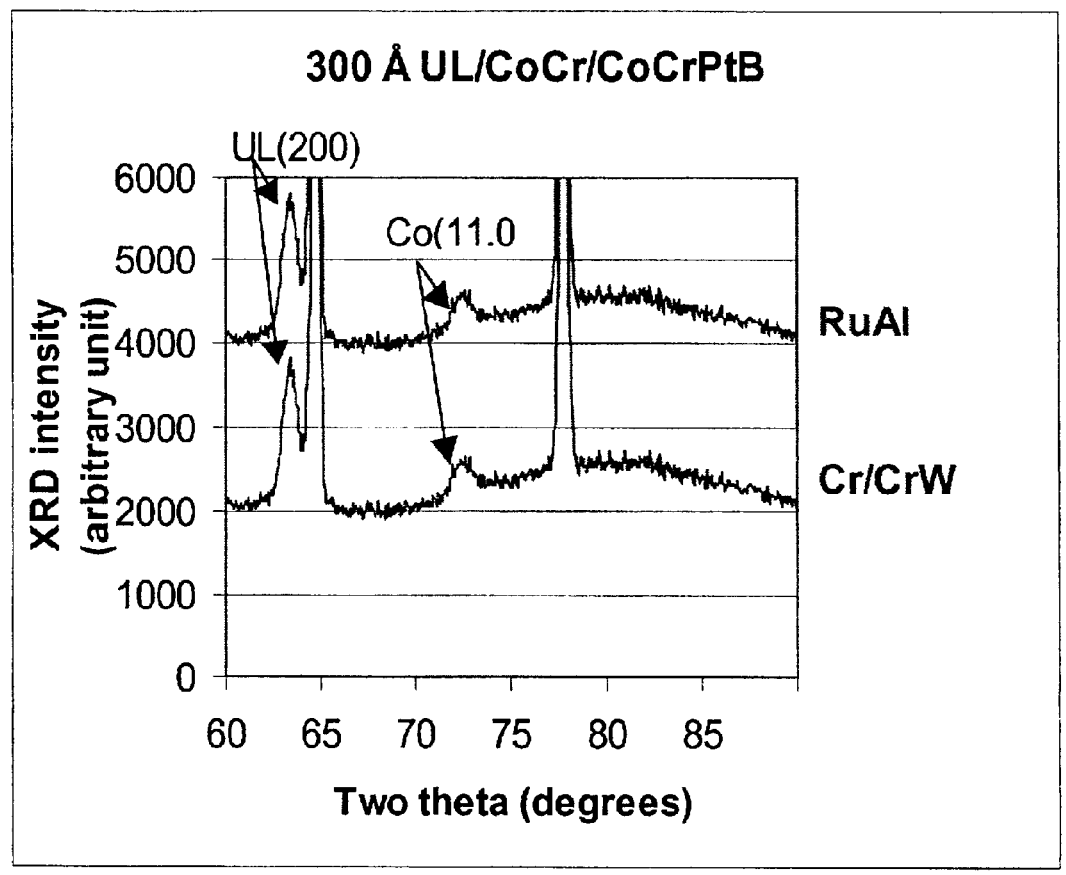
FIG. 4 shows one embodiment of the layered structure of the recording medium of this invention.
Figure 5:
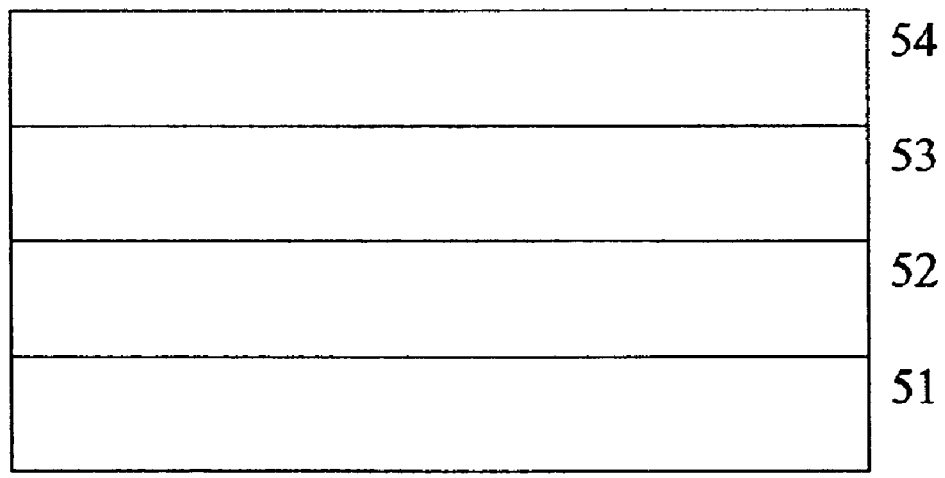
FIG. 5 shows one embodiment of the layered structure of the recording medium of this invention.

FIG. 4 shows one embodiment of the layered laminate structure of the invention. The sequential stacking arrangement of the recording media can include a substrate 51, a ruthenium-aluminum-containing underlayer 52, optionally a chromium-containing second underlayer 53, and a magnetic layer 54. Other embodiments can also include one or more of the following layers; a seedlayer, a protective overcoat layer, and one or more additional underlayers and one or more intermediate layers disposed between the ruthenium-aluminum-underlayer and the magnetic layer.

Substrates that can be used include glass, glass-ceramic, aluminum/NiP, metal alloys, plastic/polymer material, ceramic, glass-polymer, composite materials or other non-magnetic materials. The recording media can also contain a seedlayer that is preferably physically sputtered on the non-magnetic substrate. If a seedlayer is applied, the ruthenium-aluminum underlayer is then deposited on the seedlayer.

The microstructure of the ruthenium-aluminum underlayer will in many instances have an influence on the microstructure of the subsequent underlayers, e.g., the chromium-alloy second underlayer, and/or the magnetic layer. It is desired that the ruthenium-aluminum underlayer be capable of influencing the microstructure of the chromium-alloy second underlayer and/or the magnetic layer. The ruthenium-aluminum underlayer enhances the (11.0) orientation in the magnetic layer. In particular, the ruthenium-aluminum underlayer helps to align the c-axis of the magnetic layer predominantly parallel to the film surface. This provides for an improvement in the in-plane magnetic properties such as Hr and S* of the medium, which results in a relatively high SMNR.

It is also desirable for the ruthenium-aluminum underlayer to positively affect the distribution of grain size and grain shape of the later deposited layers. Small grain size provides more optimal recording properties of the longitudinal magnetic recording medium.

The ruthenium-aluminum underlayer will contain from about 45 at. % to about 51.5 at. % ruthenium. The ruthenium-aluminum underlayer can also contain nitrogen and/or oxygen depending upon the deposition environment used.

The ruthenium-aluminum underlayer has a thickness of 50 Å to 800 Å, preferably from 60 Å to 600 Å, and most preferably from 200 Å to 300 Å. In general, the thicker the ruthenium-aluminum underlayer is, the greater the coercivity is. The relative increase in coercivity of the recording media is greater for underlayers having a thickness below 200 Å. Likewise, the relative increase in SMNR of the recording media is greater for underlayers having a thickness below 200 Å. Beyond 200 Å the SMNR appears to level off with increasing thickness.

The ruthenium-aluminum underlayer alone or in combination with one or more optional underlayers can strongly influence the crystallographic orientation and the grain size and chemical segregation at the magnetic layer grain boundary. The optional second underlayers that can be used in the recording media include a chromium underlayer, and/or a chromium alloy containing one or more of the elements selected from Mn, Ru, Mg, Al, Si, Ti, V, Cu, Zr, Nb, Mo, Ta, and W. Although there is a number of underlayer materials that can be used, in practice, only a few are capable of meeting the stringent demands of the recording industry. Typically, the most successful underlayers include chromium or chromium alloyed with manganese, vanadium, titanium, tungsten, or molybdenum.

Desirably, the in-plane orientation of the magnetic layer of the recording media is achieved by grain-to-grain epitaxial growth of a hexagonal close packed (HCP) structured magnetic layer on a body centered cubic (BCC) chromium containing underlayer or a B2-structured underlayer. The polycrystalline magnetic layer is deposited with its c-axis either parallel to the film plane or with a large component of the c-axis in the film plane. Different underlayer/magnetic layer epitaxial relationships prevail for different deposition processes. The magnetic layer is deposited with the magnetic easy axis, which is the c axis in an HCP phase, substantially parallel to the plane of the magnetic layer. If multiple magnetic layers are deposited, each layer can be from about 50 Å to about 300 Å thick. Magnetic layers that can be used in the recording media are selected from CoCrPtB, CoCrPtBTa, CoCrPtBTaNb, CoCrPt, CoCrNi, CoCrPtTa, CoCrPtTaNb, and CoCrTa.

In another embodiment, the non-magnetic Al/NiP substrate of the magnetic recording medium is mechanically textured, thus providing a medium oriented having OR-Mrt of more than 1.05.

Preferably, the ruthenium-aluminum underlayer will be deposited on an oxidized NiP layer. The oxidized NiP layer will have a phosphorous content of from 12 at. % to 50 at. %, preferably from 17 at. % to 42 at. %, and most preferably from 18 at. % to 25 at. % and an oxygen content in the range from 0.5 to 50 at % in the top 50 Å of the oxidized NiP layer.

In one embodiment, a portion of a NiP layer could be oxidized by being sputter deposited with Ar and oxygen. The term "a portion of" is defined herein to include all or part of a layer. Therefore, the entire layer, i.e., extending from one end of the layer to the opposite end of the layer may be in an oxidized form. This layer could be oxidized by a reactive sputtering technique in an argon-oxygen environment. Suitable oxidizing atmospheres, at a suitable temperature, e.g., about 25° C. to about 300° C., contain about 0.1 to about 50, preferably about 0.5 to about 10, volume percent of oxygen ($O_2$), the remainder being an inert gas, such as argon (Ar), in particular, about 0.5 to about 5 volume percent oxygen, such as about 1 percent by volume oxygen. The degree of oxidation can be such that the amount of oxygen in the top 50 Å of the oxidized layer is about 0.5 at. % to about 50 at. %, such as about 20 at. % to about 30 at. %.

The recording media can also contain one or more underlayers, preferably one or more underlayers containing chromium. These underlayers are typically non-magnetic BCC materials, such as chromium or chromium alloy. The recording media can also contain one or more intermediate layers, preferably a non-magnetic HCP material, such as Ru or CoCrX, wherein X is B, Pt, Ru, Ta, Ti and Mo. In one embodiment, the cobalt-chromium intermediate layer has a Co:Cr atomic ratio selected from a ratio of about 2:1 to about 1:1 or of about 1.9:1 to about 1.3:1.

An overlayer, which is thought to prevent corrosion, may be provided adjacent to and preferably in contact with the magnetic layer. The overlayer is about 1 Å to about 50 Å thick and may contain the metals selected from W, Ta, Zr, Ti, Y, Pt, Cr or any combination thereof.

An overcoat may be provided external to the overlayer, so that the overlayer is positioned between the magnetic layer and the overcoat. The overcoat provides a mechanical wear layer and is typically 2.5–30 nm thick. It is preferably made of a ceramic material or diamond-like carbon, such as $SiO_2$, SiC, CN, $ZrO_2$ or C.

An organic lubricant may be disposed on the overcoat. The lubricant is generally 1 nm to 3 nm thick and is preferably a fluoro-chlorocarbon or a perfluoroether. Examples include $CCl_2FCClF_2$, $CF_3(CF_2)_4CF_3$, $CF_3(CF_2)_5CF_3$, $CF_3(CF_2)_{10}CF_3$, and $CF_3(CF_2)_{16}CF_3$.

In one embodiment, the laminate structure of the recording medium can be described as follows: a mechanically textured Al/NiP substrate with an oxidized NiP top layer, a ruthenium-aluminum underlayer, a chromium or chromium alloy second underlayer, a magnetic layer, and a protective overcoat.

In another embodiment, an additional CoCr alloy intermediate layer is deposited on the chromium or chromium alloy second underlayer. Preferably, the structure of this intermediate layer is HCP. The CoCr alloy could further contain Mo, Ta, Pt, Ru, Ti, and B in the range of about 0.1 at. % to about 10 at. %, more preferably 0.5 at % to 7 at %.

The magnetic recording medium has a remanent coercivity of about 3,000 Oersted (Oe) to about 10,000 Oe, and an Mrt, which is the product of magnetic remanence (Mr) and the magnetic layer thickness (t), of about 0.2 memu/$Cm^2$ to about 2.0 memu/$Cm^2$. In a preferred embodiment, the remanent coercivity is about 3,500 Oe to about 7,000 Oe, more preferably in the range of about 4,000 Oe to about 6,000 Oe, and most preferably in the range of about 4,000 Oe to about 5,500 Oe. In a preferred embodiment, the Mrt is about 0.25 memu/$Cm^2$ to about 1 memu/$cm^2$, more preferably in the range of about 0.3 memu/$cm^2$ to about 0.6 memu/$cm^2$, and most preferably in the range of about 0.3 memu/$cm^2$ to about 0.5 memu/$cm^2$.

The recording media of the invention were prepared according to the following procedures. The non-magnetic substrates were placed in a vacuum processing system capable of multilayer sputter processing. In its most basic form the processing system includes one or more heating elements, a dc (direct current) or rf (radio frequency) magnetron to sputter the target material, one or more cooling elements, and a carbon overcoat sputtering capability.

The recording media of the invention can be produced in the following manner:

1. A ruthenium-aluminum underlayer is deposited on a substrate, preferably a substrate with an oxidized NIP top layer, and wherein the surface of the substrate is mechanically textured. During this deposition process the non-magnetic substrate is heated to a temperature from about 200° C. to about 300° C., preferably from about 225° C. to about 280° C., more preferably from about 250° C. to about 280° C. The pressure within the deposition chamber during underlayer formation is from about 0.5 mTorr to about 40 mTorr, preferably from about 1 mTorr to about 20 mTorr.

2. A chromium or chromium alloy second underlayer is deposited on the ruthenium-aluminum underlayer at a deposition rate from about 5 Å/s to about 200 Å/s while maintaining a substrate bias from about 0 Volts to about −600 Volts. The deposition environment is preferably an inert environment, e.g., argon pressure, which is maintained at a pressure from about 0.5 mTorr to about 40 mTorr.

3. An optional intermediate layer can be deposited containing similar alloy components as the magnetic layer, but having a relatively higher Cr content e.g., greater than 30 at. %. In most embodiments, this intermediate layer will have a thickness from about 17.5 Å to about 100 Å. The deposition conditions for this layer can include a deposition rate of about 5 Å/s to about 60 Å, a substrate bias of about −0 Volts to about −600 Volts. The deposition environment is preferably an inert environment, e.g., argon pressure, which is maintained at a pressure from about 0.5 mTorr to about 40 mTorr.

4. A magnetic layer, preferably a CoCrPtB magnetic layer is deposited on a chromium, chromium alloy, or a cobalt-chromium intermediate layer. Deposition conditions include a deposition rate from about 5 Å/s to about 200 Å/s, preferably from about 20 Å/s to about 100 Å/s. A substrate bias from about 0 Volts to about −600 Volts, preferably from about 0 Volts to about −500 Volts, is applied. An argon-containing deposition environment at a pressure of from about 0.5 mTorr to about 40 mTorr, more preferably from about 1 mTorr to about 20 mTorr, is applied.

5. Following the deposition of the magnetic layer the prepared recording media is cooled to a temperature of or below about 150° C. An overcoat layer is then applied at a deposition rate of about 10 Å/s.

6. The recording media is removed from the processing system and about 20 Å Z-Tetrol lubricant is applied to the overcoat. The finished surface is buffed, wiped, and burnished. Some of the cleaning/polishing methods that can be used in the invention, include, but are not limited, to any one or more of following methods known to those of ordinary skill in the art; mechanical polishing, chemical polishing, electrochemical polishing, and chemical mechanical polishing.

The invention is illustrated by the following examples. The examples described were deposited on mechanically textured AlMg/NiP substrates, the surface of which was naturally oxidized. Underlayers, such as RuAl, and CrW, an intermediate layer, such as CoCr, a magnetic layer, such as CoCrPtB, and a carbon overcoat were sequentially deposited on the non-magnetic substrates with an Intevac MDP-250B sputter machine from Intevac, Santa Clara, Calif. Direct Current (DC) magnetron sputtering was used. Substrate deposition temperature was about 280° C. Magnetic properties, such as remanent coercivity (Hr), and Mrt were measured with a homemade Rotating Disk Magnetometer (RDM). Recording performances, such as SMNR, overwrite (OW), and full width at half maximum of output signal (PW50), were measured on a spin stand from Guzik, San Jose, Calif., with a head consisting of a write element and a giant magnetoresistive (GMR) read element. 500 kfci was used for the recording test.

The film composition of the samples described in FIGS. 1 to 4 and Table II is shown in Table I.

TABLE I

| Film | CrW | RuAl | CoCr | CoCrPtB |
|---|---|---|---|---|
| Composition (at. %) | Cr90—W10 | Ru50—Al50 | Co63—Cr37 | Co61—Cr15—Pt12—B12 |

Figure 1:
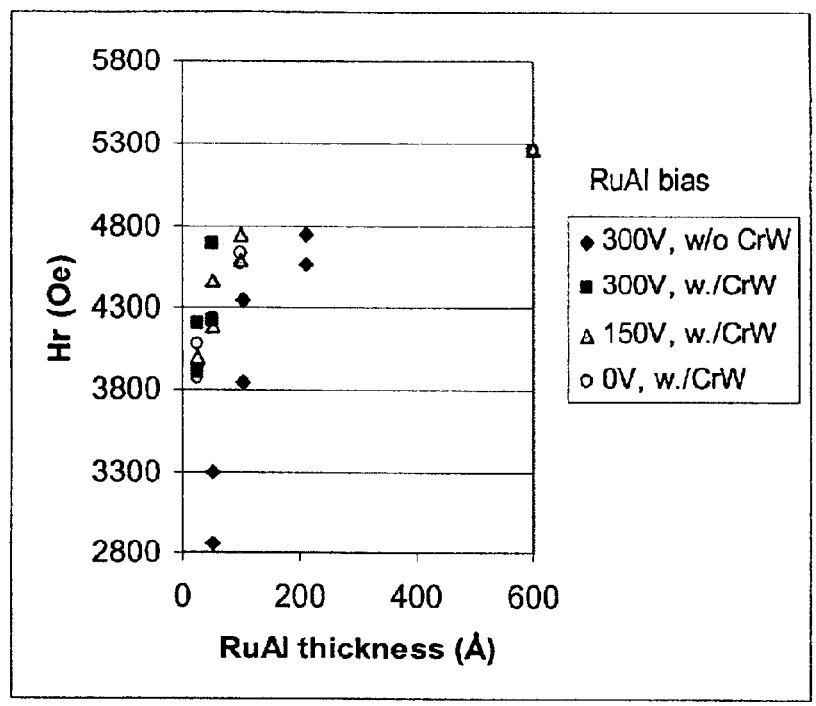
FIG. 1 shows remanent coercivity (Hr) and medium signal-to-noise ratio (SMNR) of $RuAl/CrW_{10}/CoCr_{37}/CoCr_{15}Pt_{12}B_{12}$ and $RuAl/CoCr_{37}/CoCr_{15}Pt_{12}B_{12}$ media deposited sequentially from the left layer to the right layer.
Figure 1:
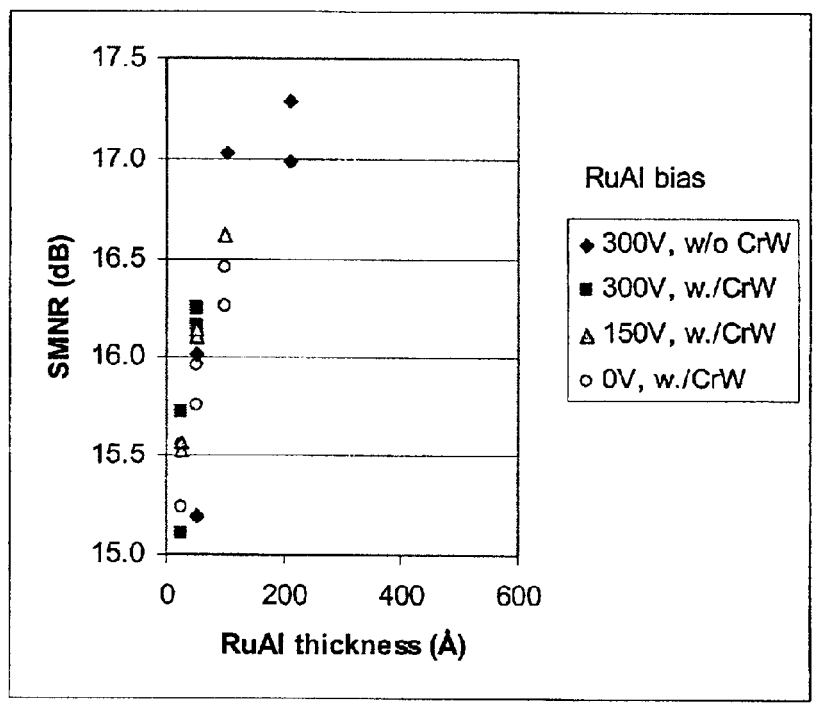

FIG. 1 shows remanent coercivity (Hr) and medium signal-to-noise ratio (SMNR) of RuAl/CrW$_{10}$/CoCr$_{37}$/ CoCr$_{15}$Pt$_{12}$B$_{12}$ and RuAl/CoCr$_{37}$/CoCr$_{15}$Pt$_{12}$B$_{12}$ media deposited sequentially from the left layer to the right layer. Substrate bias for RuAl deposition was varied as indicated in the legend provided. RuAl thickness was varied as indicated by the horizontal axis. The thickness of CrW$_{10}$, CoCr$_{37}$ and CoCr$_{15}$ Pt$_{12}$B$_{12}$ layers for both kinds of media compositions whose data are shown in FIG. 1 were 57 Å, 25 Å, and 180 Å, respectively.

Figure 2:
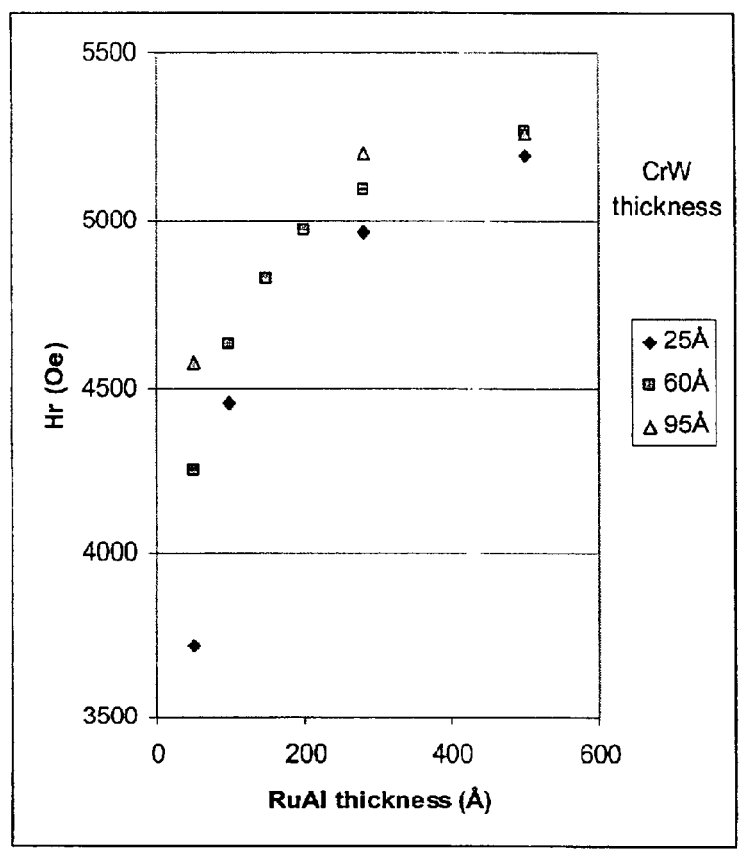
FIG. 2 shows remanent coercivity (Hr) and medium signal-to-noise ratio (SMNR) data for $RuAl/CrW_{10}/CoCr_{37}/CoCr_{15}Pt_{12}B_{12}$ media with varying thickness of RuAl and $CrW_{10}$.
Figure 2:
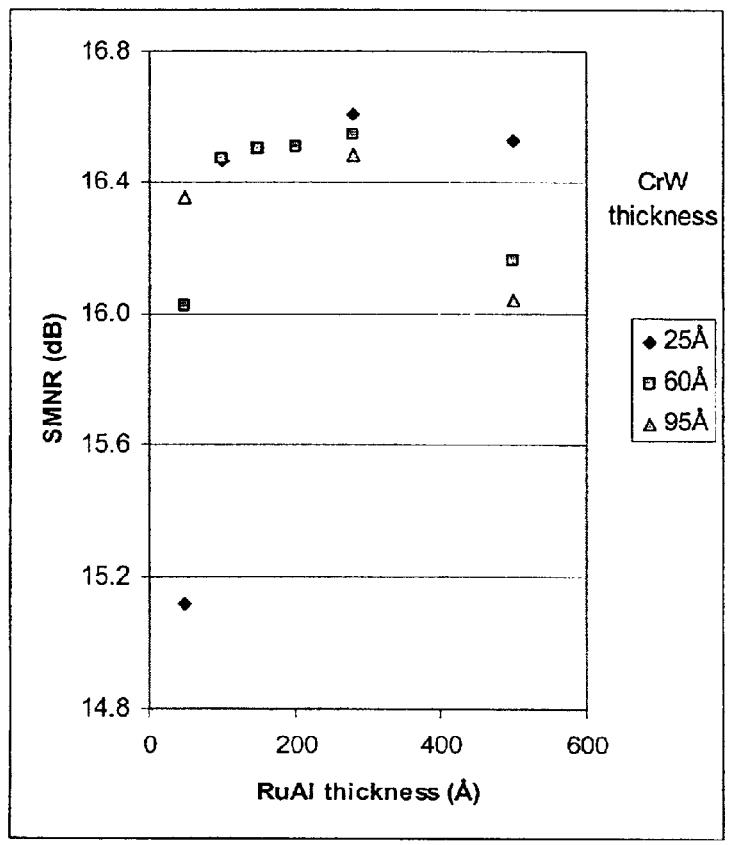

FIG. 2 shows remanent coercivity (Hr) and medium signal-to-noise ratio (SMNR) data for RuAl/CrW$_{10}$/CoCr$_{37}$/ CoCr$_{15}$Pt$_{12}$B$_{12}$ media with varying thickness of RuAl and CrW$_{10}$. The thickness of CoCr$_{37}$ and CoCr$_{15}$Pt$_{12}$B$_{12}$ was 25 Å and 180 Å, respectively.

Figure 3:
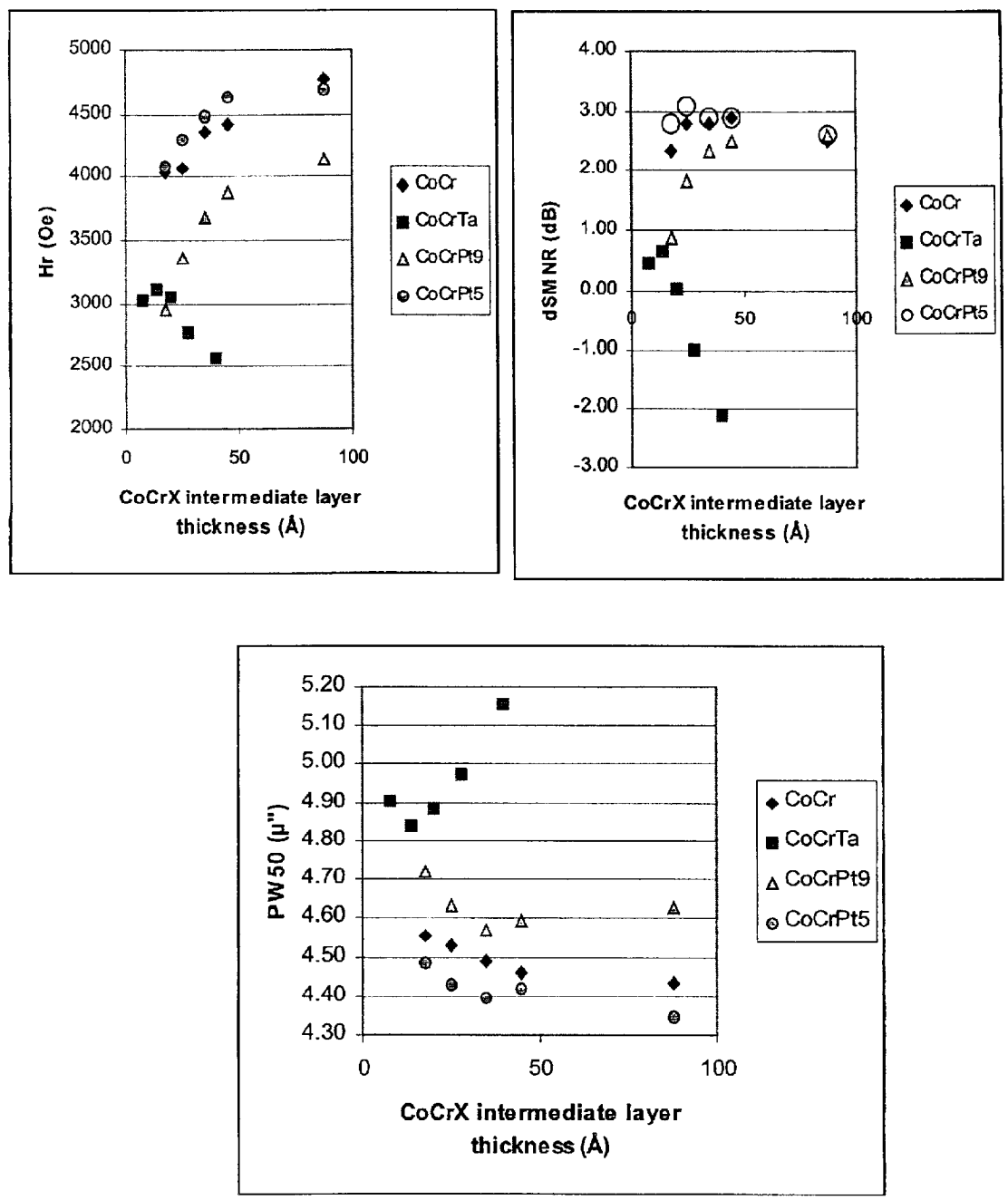
FIG. 3 shows how the recording characteristics, that is, Hr, SMNR, and PW50, are affected by varying the type and thickness of the cobalt-chromium alloy intermediate layer for $RuAl/CrW_{10}/CoCrX/CoCr_{15}Pt_{12}B_{12}$ media, wherein CoCrX is $CoCr_{37}$, $CoCr_{14}Ta_4$, $CoCr_{30}Pt_9$, or $CoCr_{37}Pt_5$.

FIG. 3 shows how the recording characteristics, that is, Hr, SMNR, and PW50, are affected by varying the type and thickness of the cobalt-chromium alloy intermediate layer for RuAl/CrW$_{10}$/CoCrX/CoCr$_{15}$Pt$_{12}$B$_{12}$ media, wherein CoCrX is CoCr$_{37}$, CoCr$_{14}$Ta$_{4}$, CoCr$_{30}$Pt$_{9}$, or CoCr$_{37}$Pt$_{5}$. dSMNR is the SMNR difference between the tested disks and one reference disk. The thickness of the RuAl and CoCr$_{15}$ Pt$_{12}$B$_{12}$ magnetic layer was 200 Å and 180 Å, respectively. As suggested by the data, recording media with intermediate layers of CoCr$_{14}$Ta$_{4}$ and CoCr$_{30}$Pt$_{9}$ exhibit less desirable recording characteristics than CoCr$_{37}$, and CoCr$_{37}$Pt$_{5}$. Recording media with a CoCr$_{37}$ or a CoCr$_{37}$Pt$_{5}$ intermediate layer with a thickness from about 17.5 Å to about 100 Å exhibited remanent coercivities greater than 4000 Oe, a dSMNR value of 2 dB or greater, and a PW50 value of less than 4.60μ".

X-ray diffraction (XRD) patterns of recording media with a RuAl underlayer and a Cr/CrW$_{10}$ underlayer were taken. The thickness of RuAl and the total thickness of Cr and CrW both were about 300 Å. The X-ray diffraction data was taken in the θ-2θ mode. The CoCr$_{37}$ intermediate layer and CoCr$_{15}$Pt$_{12}$B$_{12}$ magnetic layer had a thickness of 45 Å and 180 Å, respectively. Both underlayers exhibited cubic (200) preferred crystallographic orientations. Both recording media exhibited a Co(11.0) preferred crystallographic orientations, which is desirable for high-density longitudinal magnetic recording.

Examples A and B listed in Table II have an identical magnetic layer, i.e., a CoCr$_{15}$Pt$_{12}$B$_{12}$ alloy, and an identical Mrt value. Sample A has film structure of Cr/CrW$_{10}$/CoCr$_{37}$/ CoCr$_{15}$ Pt$_{12}$B$_{12}$. Sample B has film structure of RuAl/ CoCr$_{37}$/CoCr$_{15}$Pt$_{12}$B$_{12}$. Surprisingly, samples A and B have similar SMNR values in spite of the lower OR value of sample B, i.e., the recording media with the RuAl underlayer. Therefore, if the remanent coercivity of sample B is reduced to 4,340 Oe, as in sample A, the overwrite (OW) of sample B will be even greater than that of sample A.

TABLE II

| Sample | Underlayer | OR-Mrt | SMNR (dB) | Hr (Oe) | Mrt (memu/cm$^2$) | OW (dB) |
|---|---|---|---|---|---|---|
| A | Cr/CrW | 1.54 | 18.45 | 4340 | 0.37 | 24.2 |
| B | RuAl | 1.09 | 18.15 | 4540 | 0.37 | 26.5 |

Table III lists lattice plane distances (d) of CrW$_{10}$, RuAl and widely used alloyed CoCrPtB magnetic layers such as CoCr$_{15}$Pt$_{12}$B$_{12}$ and CoCr$_{15}$Pt$_{16}$B$_{12}$. As shown, the RuAl underlayer has less lattice mismatch with the magnetic layers than CrW$_{10}$.

TABLE III

| Film | Plane | 2d(Å) |
|---|---|---|
| CoCr$_{15}$Pt$_{12}$B$_{12}$ | (0002) | 4.237 |
| CoCr$_{15}$Pt$_{16}$B$_{12}$ | (0002) | 4.275 |
| CrW$_{10}$ | (110) | 4.14 |
| Ru$_{50}$Al$_{50}$ | (110) | 4.274 |

The provided examples illustrate the effect of the ruthenium-aluminum underlayer in combination with a chromium-alloy second underlayer on the magnetic properties of a recording media. The Ru$_{50}$Al$_{50}$ underlayer of this invention has a melting point of 2040° C., which is considerably higher than 1638 and 1800° C., respectively, of Ni$_{50}$Al$_{50}$ and Cr. Sputtered films of materials with high melting point and B2 structure were found to promote small grain size, which yields low media noise.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the patents and publications referred in this application are hereby incorporated herein by reference.

What is claimed is:

1. A magnetic recording medium, comprising:

a non-magnetic substrate; an oxidized NiP layer on the non-magnetic substrate;

a B2-structured ruthenium-aluminum-containing underlayer comprising a (200) crystallographic orientation; and a magnetic layer comprising a Co(11.0) crystallographic orientation, wherein the non-magnetic substrate is mechanically textured and OR-Mrt of the magnetic recording medium is more than about 1.05, thereby the magnetic recording medium is an oriented medium.

2. The magnetic recording medium of claim 1, wherein the ruthenium-aluminum-containing underlayer comprises RuAl and Ru is in a range from about 45 to about 51.5 atomic percent.

3. The magnetic recording medium of claim 1, wherein the non-magnetic substrate is non-metallic.

4. The magnetic recording medium of claim 1, wherein the non-magnetic substrate is an Al-alloy substrate comprising electrolessly plated NiP, wherein the surface of the NiP film is oxidized.

5. The magnetic recording medium of claim 1, further comprising a chromium-containing second underlayer disposed between the ruthenium-aluminum-containing underlayer and the magnetic layer.

6. The magnetic recording medium of claim 3, wherein the oxidized NiP film comprises a phosphorus content in a range of about 12 to about 50 atomic percent and an oxygen content in a range of about 0.5 to about 50 atomic percent in the top 50 Å of the oxidized NiP film.

7. The magnetic recording medium of claim 6, wherein the oxidized NiP film has a thickness of about 50–200,000 Å.

8. The magnetic recording medium of claim 1, wherein the magnetic layer comprises an alloy material selected from the group consisting of CoCrPtB, CoCrPtBTa, CoCrPtBTaNb, CoCrPt, CoCrNi, CoCrPtTa, CoCrPtTaNb, and CoCrTa.

9. The magnetic recording medium of claim 1, wherein the ruthenium-aluminum-containing underlayer has a thickness of about 50–800 Å.

10. A method of making a magnetic recording medium comprising:

providing a non-magnetic substrate; depositing an oxidized NiP layer on the non-magnetic substrate;

depositing a B-2 structured ruthenium-aluminum-containing underlayer comprising a (200) crystallographic orientation on the non-magnetic substrate; and depositing a magnetic layer comprising a Co(11.0) crystallographic orientation on the B-2 structured ruthenium-aluminum-containing underlayer, wherein the non-magnetic substrate is mechanically textured and OR-Mrt of the magnetic recording medium is more than about 1.05, thereby the magnetic recording medium is an oriented medium.

11. The method of claim 10, wherein the ruthenium-aluminum underlayer comprises from about 45 to about 51.5 atomic percent ruthenium.

12. The method of claim 10, further comprising depositing a chromium-containing second underlayer between the RuAl-containing underlayer and the magnetic layer.

13. The method of claim 10, further comprising depositing a CoCr-containing intermediate layer between the RuAl-containing underlayer and the magnetic layer.

14. The method of claim 10, wherein the magnetic layer comprises an alloy material selected from the group consisting of CoCrPtB, CoCrPtBTa, CoCrPtBTaNb, CoCrPt, CoCrNi, CoCrPtTa, CoCrPtTaNb, and CoCrTa.

15. The method of claim 10, wherein the ruthenium-aluminum-containing underlayer has a thickness of about 50 Å to about 800 Å.

16. The method of claim 10, wherein the oxidized NiP layer is sputter deposited.

17. The method of claim 10, further comprising electroless plating of the non-magnetic substrate with a NiP layer, then oxidizing and mechanical texturing the surface of the NiP layer, wherein the non-magnetic substrate is an Al-alloy substrate.

18. The method of claim 16, wherein the oxidized NiP layer comprises a phosphorous content of from about 12 at. % to about 50 at. %, and an oxygen content of from about 0.5 at. % to about 50 at. % in the top 50 Å of the oxidized NiP layer.

* * * * *